(12) United States Patent
Martinez Flores et al.

(10) Patent No.: US 12,422,000 B2
(45) Date of Patent: Sep. 23, 2025

(54) RIGID-ELASTIC BOOT FOR SHAFT JOINT

(71) Applicant: Ford Global Technologies, LLC, Dearborn, MI (US)

(72) Inventors: Edgar Isaias Martinez Flores, Xochimilco (MX); Rodrigo Alvarez Eldin, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 17/871,024

(22) Filed: Jul. 22, 2022

(65) Prior Publication Data

US 2024/0026933 A1    Jan. 25, 2024

(51) Int. Cl.
  *F16D 3/84*   (2006.01)
  *F16J 15/52*  (2006.01)
  *F16J 15/54*  (2006.01)

(52) U.S. Cl.
  CPC ............ *F16D 3/845* (2013.01); *F16J 15/52* (2013.01); *F16J 15/54* (2013.01)

(58) Field of Classification Search
  CPC ............ F16D 3/845; F16J 15/52; F16J 15/54
  USPC ............................................ 464/175; 92/46
  See application file for complete search history.

(56) References Cited

U.S. PATENT DOCUMENTS

| | | | | |
|---|---|---|---|---|
| 1,141,360 | A | * | 6/1915 | Rudd ............... F16F 9/0454 92/46 |
| 3,222,484 | A | * | 12/1965 | Jennings ......... H01H 33/66238 92/46 |
| 4,516,959 | A | | 5/1985 | Krude |
| 4,560,150 | A | * | 12/1985 | Shtarkman ............ F16F 13/20 |
| 4,936,811 | A | | 6/1990 | Baker |
| 5,236,394 | A | | 8/1993 | Collins et al. |
| 5,900,205 | A | | 5/1999 | Sadr et al. |
| 7,056,219 | B2 | | 6/2006 | Toriumi et al. |
| 7,229,358 | B2 | | 6/2007 | Carlini et al. |
| 7,553,238 | B2 | | 6/2009 | Wormsbaecher et al. |
| 8,070,612 | B2 | | 12/2011 | Suzuki et al. |
| 2004/0017046 | A1 | | 1/2004 | Frazer et al. |
| 2004/0116193 | A1 | | 6/2004 | Toriumi et al. |
| 2005/0236779 | A1 | | 10/2005 | You |
| 2018/0031047 | A1 | | 2/2018 | Takabe et al. |

FOREIGN PATENT DOCUMENTS

| | | | |
|---|---|---|---|
| CN | 111836974 | 10/2020 | |
| DE | 904 127 C * | 2/1954 | ............ 403/50 |
| EP | 0784079 | 2/2001 | |
| EP | 1048864 | 5/2001 | |
| JP | 2006090391 | 4/2006 | |
| JP | 2008031408 | 2/2008 | |
| JP | 4527578 | 8/2010 | |

* cited by examiner

*Primary Examiner* — Greg Binda
(74) *Attorney, Agent, or Firm* — Burris Law, PLLC

(57) ABSTRACT

A boot for a shaft joint includes a plurality of rigid rings and a plurality of flexible rings. Each rigid ring has an annular shape disposed about a central axis of the boot. The rigid rings are arranged sequentially along the central axis. Each rigid ring is connected to an adjacent rigid ring by a corresponding one of the flexible rings.

18 Claims, 3 Drawing Sheets

RIGID-ELASTIC BOOT FOR SHAFT JOINT

FIELD

The present invention relates to a boot for a shaft joint, and more specifically, to a boot for a constant velocity joint.

BACKGROUND

The statements in this section merely provide background information related to the present disclosure and may not constitute prior art.

A joint that connects a shaft to another component (e.g., a constant velocity joint connecting two rotating shafts in a vehicle) is typically covered by a boot to protect the joint and to retain lubrication within the joint. Such joints are configured to permit the shaft to be able to pivot relative to the component to which it is connected. As such, the boot is typically made of a single piece of flexible rubber material that spans the entire joint and is connected to the shaft and the component to which the shaft is connected. While such boots work well for some applications, such rubber boots can be cut or punctured, which can lead to leaking of grease or ingress of water or contaminants into the joint.

The teachings of the present disclosure address these and other issues associated with typical shaft joint boots.

SUMMARY

This section provides a general summary of the disclosure and is not a comprehensive disclosure of its full scope or all of its features.

In one form, the present disclosure provides a boot for a shaft joint includes a plurality of rigid rings and a plurality of flexible rings. Each rigid ring has an annular shape disposed about a central axis of the boot. The rigid rings are arranged sequentially along the central axis. Each rigid ring is connected to an adjacent rigid ring by a corresponding one of the flexible rings.

According to one form, the rigid rings increase in outermost diameter with increased position along the central axis from a first end of the boot to a second end of the boot.

According to another form, each rigid ring axially overlaps at least one other rigid ring.

According to yet another form, each rigid ring includes nose portion and a base portion, the nose portion being closer to a first end of the boot than the base portion, the base portion being closer to a second end of the boot than the nose portion. The base portion has a greater outermost diameter than the nose portion.

According to one form, the base portion of each rigid ring axially overlaps the nose portion of the adjacent rigid ring.

According to another form, the base portion of each rigid ring is connected to the nose portion of the adjacent rigid ring by the corresponding flexible ring.

According to another form, each flexible ring is attached to a radially inner side of the base portion to which it is attached.

According to yet another form, each flexible ring is attached to a radially outer side of the nose portion to which it is attached.

According to one form, each flexible ring has an inner portion and an outer portion radially outward of the inner portion, wherein the flexible ring follows a serpentine path from the inner portion to the outer portion.

According to another form, an entirety of each flexible ring is axially overlapped by the base portion to which it is attached.

According to yet another form, the base portion of each rigid ring is connected to the nose portion of the adjacent rigid ring by the corresponding flexible ring.

According to one form, an outer surface of each rigid ring follows a contour that is concave proximate the nose portion and convex proximate the base portion.

According to another form, each rigid ring includes nose portion and a base portion, the base portion being closer to the second end than the nose portion, and an outer surface of the rigid ring tapering radially inward from the base portion to the nose portion.

According to yet another form, each flexible ring has a shape that follows a serpentine path in a radially outward direction relative to the central axis.

According to one form, the boot further includes a flexible first end mount and a flexible second end mount, the first end mount being attached to a first one of the rigid rings that is furthest in a first axial direction, the second end mount being attached to a last one of the rigid rings that is furthest in a second axial direction. The first end mount being configured to surround and seal on a first vehicle component and the second end mount being configured to surround and seal on a second vehicle component such that the plurality of rigid rings and the plurality of flexible rings surround a joint connecting the first vehicle component to the second vehicle component.

According to another form, the first vehicle component is a first shaft, the second vehicle component is a second shaft, and the joint is a constant velocity joint.

According to yet another form, the present disclosure provides for a boot for a shaft joint including a series of annular rigid rings and a plurality of flexible rings. The series of annular rigid rings are disposed about a central axis and arranged sequentially in an axial direction of the central axis. Each rigid ring includes nose portion and a base portion. The nose portion is closer to a first end of the boot than the base portion. The base portion is closer to a second end of the boot than the nose portion. The base portion has a greater outermost diameter than the nose portion. The base portion of each rigid ring axially overlaps the nose portion of the adjacent rigid ring. The outermost diameter of the base portions increase with increased position along the central axis from the first end to the second end. Each rigid ring is connected to an adjacent rigid ring by a corresponding one of the flexible rings. The base portion of each rigid ring is connected to the nose portion of the adjacent rigid ring by the corresponding flexible ring.

According to one form, each flexible ring has an inner portion and an outer portion radially outward of the inner portion, wherein the flexible ring follows a serpentine path from the inner portion to the outer portion.

According to another form, an outer surface of each rigid ring follows a contour that is concave proximate the nose portion and convex proximate the base portion.

According to yet another form, the boot further includes a first end mount and a second end mount, the first end mount being attached to a first one of the rigid rings that is proximate the first end, the second end mount being attached to a last one of the rigid rings that is proximate the second end. The first end mount being configured to seal on a first vehicle component and the second end mount being configured to seal on a second vehicle component such that the plurality of rigid rings and the plurality of flexible rings surround a constant velocity joint connecting the first vehicle component to the second vehicle component.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
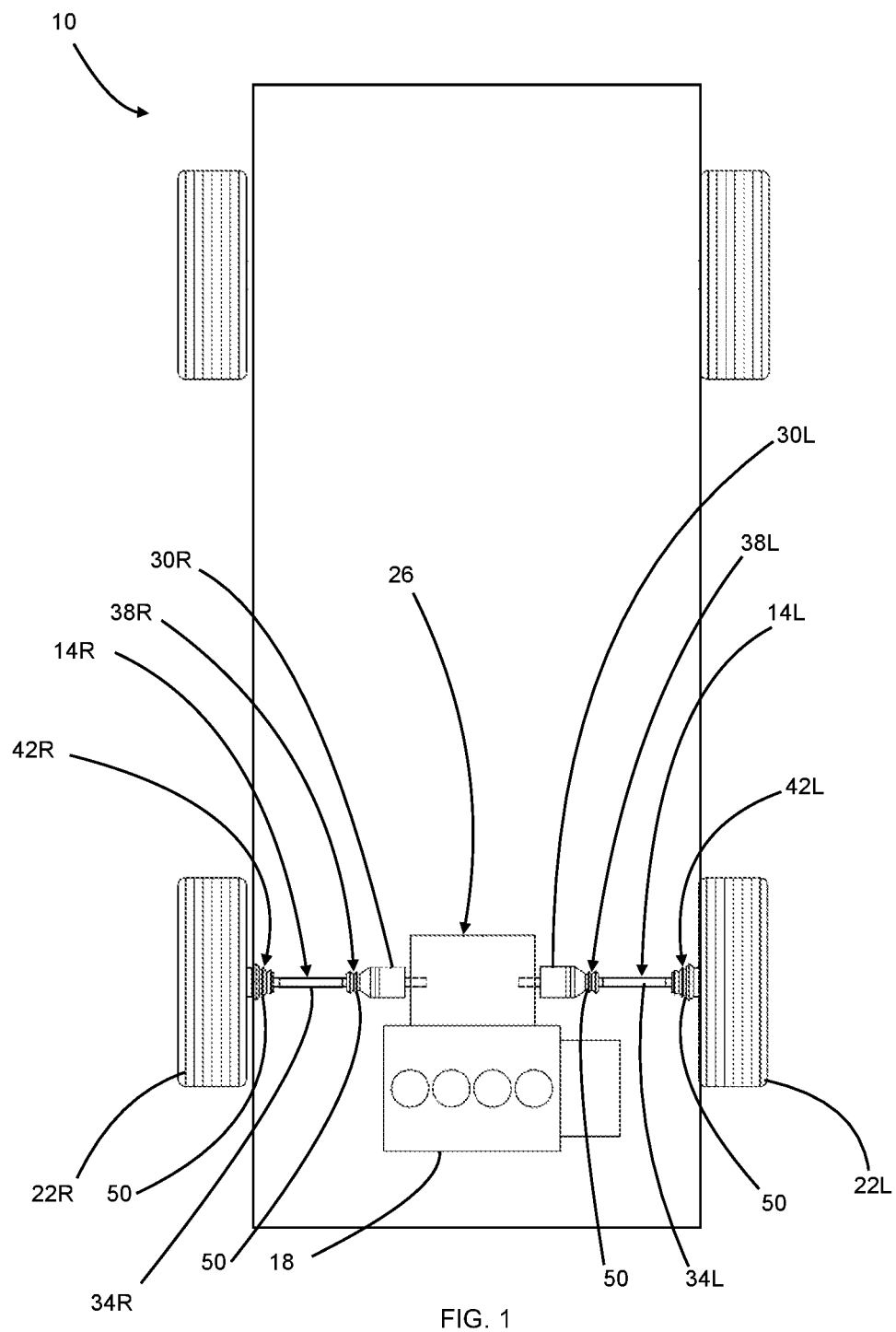
FIG. 1 is a schematic view of an example vehicle including a boot for a shaft joint in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an example vehicle 10 is schematically illustrated. The vehicle 10 generally includes a pair of half-shafts 14L, 14R that receive rotary power from a rotary power source 18 (e.g., an internal combustion engine and/or an electric motor) and transmit that rotary power to a corresponding drive wheel 22L, 22R to propel the vehicle.

In the example provided, the vehicle 10 is a front-wheel drive vehicle, though other configurations can be used, such as rear-wheel drive, all-wheel drive, four-wheel drive, for example. In the example provided, the half-shafts 14L, 14R receive rotary power from a differential (not specifically shown) that is part of a transmission or transaxle 26 that receives rotary power from the rotary power source 18, though other configurations can be used, such as each half-shaft 14L, 14R being connected to an individual motor directly or via a corresponding gearbox, or a differential connected to a transmission via a prop-shaft, for example. In the example provided, the rotary power source 18 is an internal combustion engine though other configurations can be used, such as one or more electric motors (not shown) or a hybrid configuration with an internal combustion engine and one or more electric motors, for example.

Each half-shaft 14L, 14R includes a first component or first shaft 30L, 30R connected to a second shaft 34L, 34R by a first shaft joint 38L, 38R. The second shaft 34L, 34R may be connected to the drive wheel 22L, 22R (e.g., via a wheel hub) via another shaft joint 42L, 42R. The shaft joint 38L, 38R is configured to permit the second shaft 34L, 34R to move (e.g., pivot and/or plunge axially) relative to the first shaft 30L, 30R. The shaft joint 42L, 42R is configured to permit the drive wheel 22L, 22R to move (e.g., pivot and/or plunge axially) relative to the second shaft 34L, 34R. In the example provided, the shaft joints 38L, 38R, 42L, 42R are constant velocity joints (e.g., Rzeppa joints), though other types of joints may be used.

A corresponding boot 50 covers each shaft joint 38L, 38R, 42L, 42R. While the boot 50 is described herein as covering a shaft joint of a vehicle half-shaft, the teachings of the present disclosure also apply to boots that can cover other types of joints including non-powered shafts.

Figure 2:
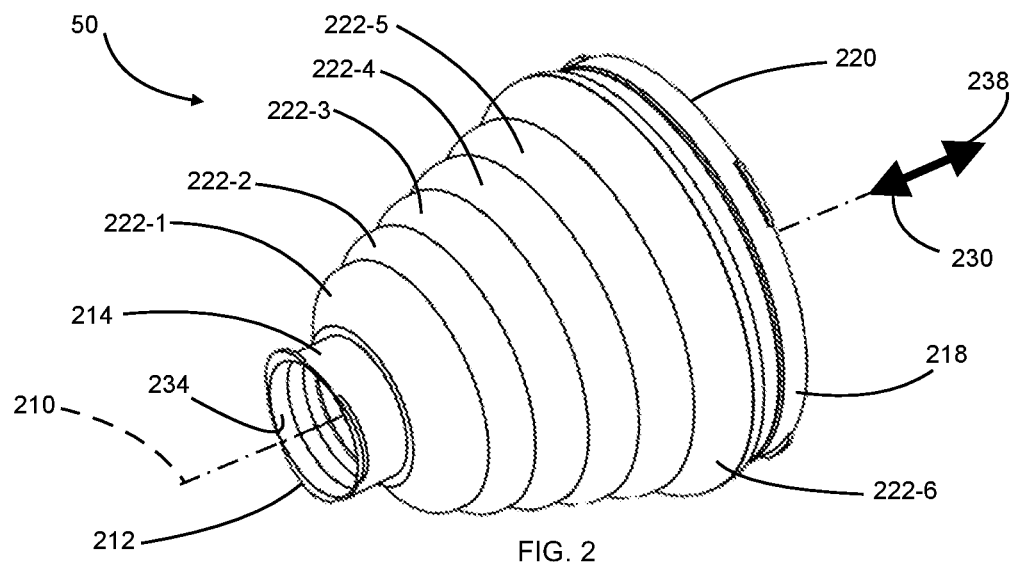
FIG. 2 is a perspective view of the boot of FIG. 1.
Figure 3:
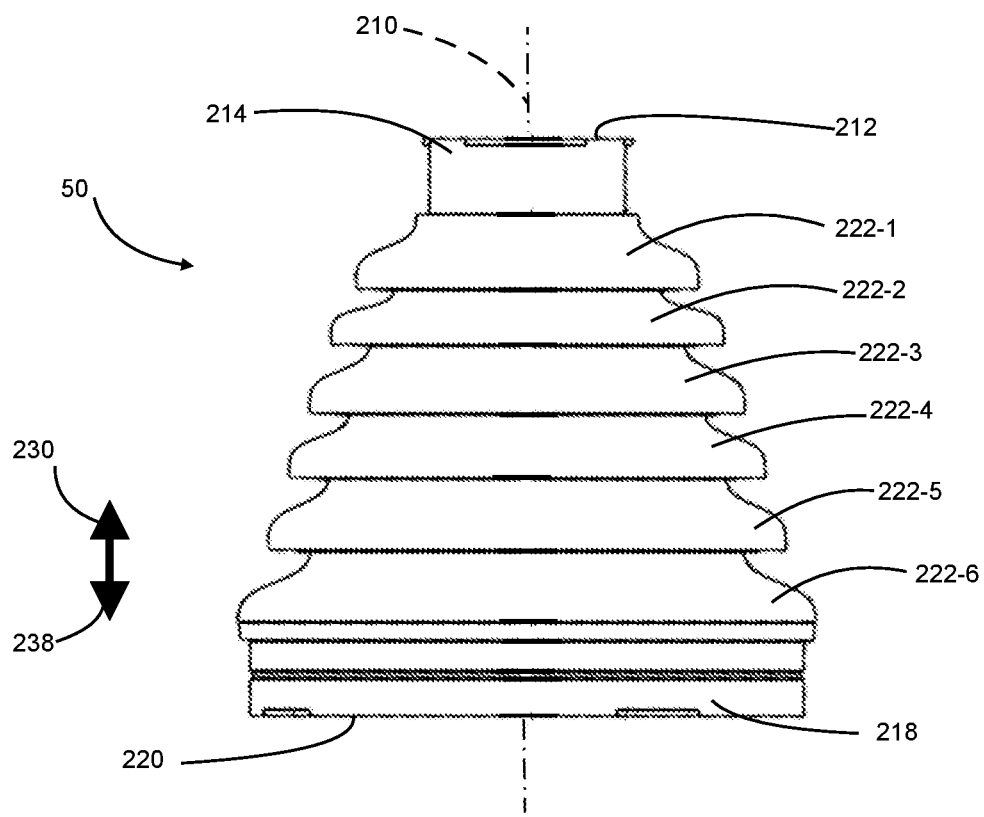
FIG. 3 is a side view of the boot of FIG. 1.
Figure 4:
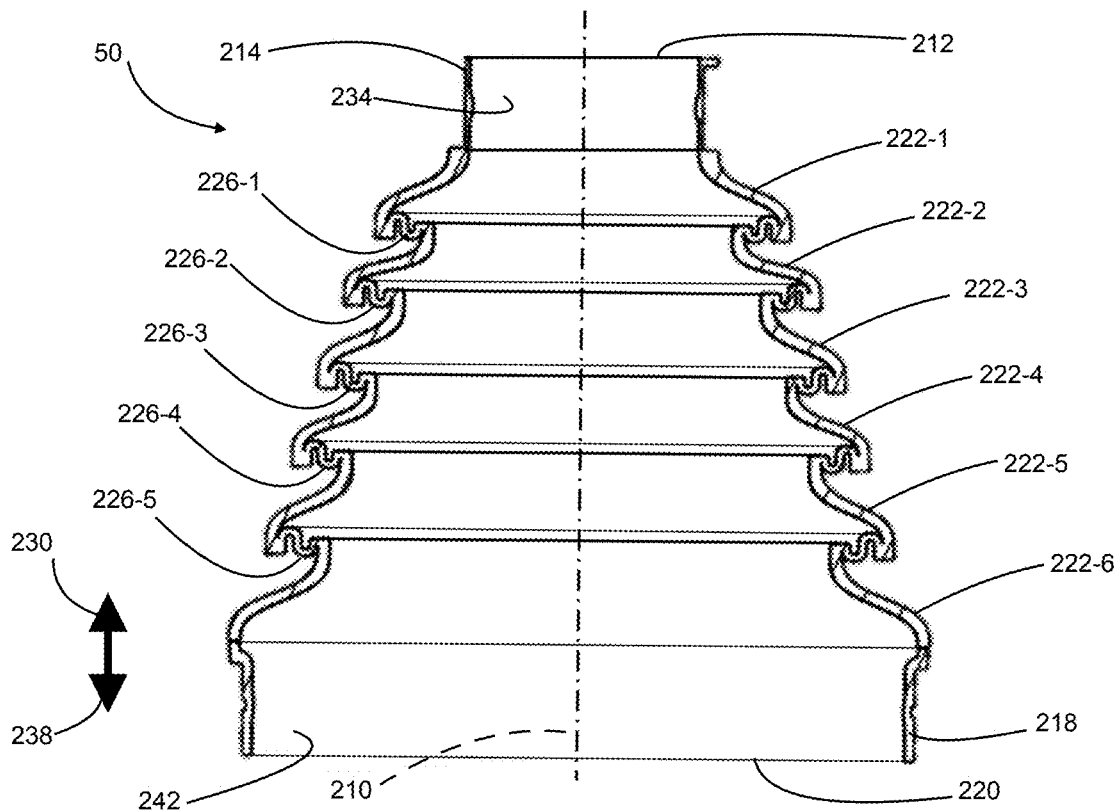
FIG. 4 is a cross-sectional view of the boot of FIG. 1, taken along a central axis of the boot.

Referring to FIGS. 2-4, the boot 50 is generally disposed about a central axis 210 though, as described herein, the boot 50 permits flexibility of the shaft joint 38L, 38R, 42L, 42R (FIG. 1) that it covers such that the central axis 210 may bend depending on the relative positions of the two components connected by the joint 38L, 38R, 42L, 42R (FIG. 1). The boot 50 includes a first mount 214 at a first axial end 212, a second mount 218 at a second axial end 220, and a plurality of annular rigid bodies or rigid rings 222-1, 222-2, 222-3, 222-4, 222-5, 222-6 (collectively and generally referred to herein as rigid rings 222) connected by a plurality of annular flexible bodies or flexible rings 226-1, 226-2, 226-3, 226-4, 226-5 (shown in FIG. 4; collectively and generally referred to herein as flexible rings 226).

Each rigid ring 222 is an annular shape disposed about the central axis 210 and sequentially positioned between the first mount 214 and the second mount 218. Each rigid ring 222 is formed of a rigid material (e.g., metal, plastic, composite) and is a unitarily formed body. Each flexible ring 226 is formed of a flexible material (e.g., rubber, flexible polymer) and is a unitarily formed body. Each flexible ring 226 is attached to two of the rigid rings 222 (i.e., adjacent rigid rings 222) and permits movement between the two rigid rings 222.

The rigid material of the rigid rings 222 is significantly less flexible than the flexible material of the flexible rings 226. In other words, the rigid material may have a significantly higher Young's Modulus than the flexible material. To put it another way, the flexible material may be able to be bent and/or stretched elastically so that it can return to its original shape, whereas bending or stretching of the rigid material may break or remain permanently deformed. The rigid material may be more resistant to cutting or puncture than the flexible material.

The first one of the rigid rings 222-1 is located proximate the first axial end 212 and is coupled to the first mount 214. In the example provided, the first mount 214 is a flexible ring that extends in a first axial direction 230 from the first rigid ring 222-1 and is configured to be disposed about a shaft (e.g., the second shaft 34L or 34R in the example shown in FIG. 1) such that an inner surface 234 of the first mount 214 seals on the outer surface of that shaft. While not specifically shown, a clamp (e.g., a band clamp) can be disposed about the first mount 214 and tightened down to secure the first mount 214 to the shaft for movement (e.g., pivoting and/or rotation and/or plunging) therewith. In an alternative configuration, not specifically shown, the first mount 214 may be a rigid material configured to interlock with or otherwise connect to a mating feature on the shaft.

Returning to the example provided, each subsequent rigid ring 222 in an axial direction 238 toward the second axial end 220 is connected to the adjacent, immediately preceding rigid ring 222 by a corresponding one of the flexible rings 226. For example, rigid ring 222-1 is connected to rigid ring 222-2 by flexible ring 226-1, rigid ring 222-2 is connected to rigid ring 222-3 by flexible ring 226-2, and so on until the last rigid ring 222-6, proximate the second end 220. While the example provided includes six rigid rings 222 and five flexible rings 226, any number of rigid rings 222 and corresponding flexible rings 226 can be used.

The last rigid ring 222-6 is coupled to the second mount 218. In the example provided the second mount 218 is a rubber ring that extends in the second axial direction 238 from the last rigid ring 222-6 and is configured to be disposed about another component (e.g., the shaft 30L, 30R or a portion of the hub associated with the wheel 22L, 22R in the example shown in FIG. 1) such that an inner surface 242 of the second mount 218 seals on the outer surface of that other component. While not specifically shown, a clamp (e.g., a band clamp) can be disposed about the second mount 218 and tightened down to secure the second mount 218 to the component for movement (e.g., pivoting and/or rotation and/or plunging) therewith. In an alternative configuration, not specifically shown, the second mount 218 may be a rigid material configured to interlock with or otherwise connect to a mating feature on the component.

Figure 5:
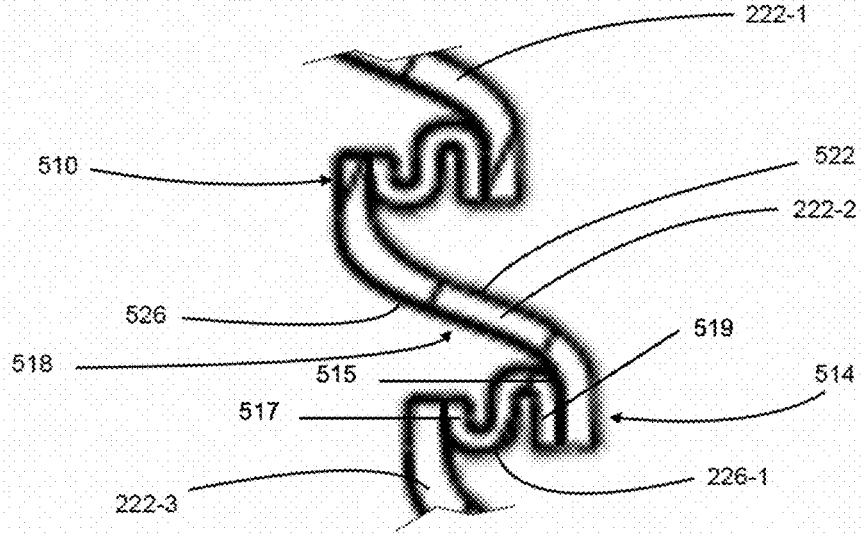
FIG. 5 is a cross-sectional view of a portion of the boot of FIG. 1, taken along the central axis of the boot.

Referring to FIG. 5, each rigid ring 222 has a nose portion 510, a base portion 514, and a connecting portion 518 that connects the nose portion 510 to the base portion 514. An outer surface 522 (i.e., on the radially outward side of the rigid ring 222) defines a smaller outer diameter of the rigid ring 222 at the nose portion 510 than at the base portion 514. As such, the base portion 514 defines the outermost diameter of each rigid ring 222. In other words, each rigid ring 222 expands from the nose portion 510 to the base portion 514. To put it yet another way, each rigid ring 222 generally tapers radially inward from the base portion 514 to the nose portion 510.

The nose portion 510 has a smaller inner diameter than the base portion 514. In the example provided, each rigid ring 222 has a substantially uniform thickness from the nose portion 510 to the base portion 514, though other configurations can be used. In the example provided, the outer surface 522 follows a contour that is concave at the transition from the nose portion 510 to the connecting portion 518 and convex at the transition from the connecting portion 518 to the base portion 514, though other configurations can be used.

Likewise, an inner surface 526 (i.e., on the radially inward side of the rigid ring 222) follows a contour that is convex at the transition from the nose portion 510 to the connecting portion 518 and concave at the transition from the connecting portion 518 to the base portion 514, though other configurations can be used.

In the example provided, each rigid ring 222 has a generally "S" shaped cross-sectional shape such that the nose portion 510 and the base portion 514 extend substantially parallel to the axis 210 (FIG. 4), with the base portion 514 being radially outward of the nose portion 510, while the connecting portion 518 extends radially outward relative to the axis 210 (FIG. 4) from the nose portion 510 to the base portion 514.

The base portion 514 of each rigid ring 222, except the last rigid ring 222-6 (FIG. 4), overlaps in the axial direction with the nose portion 510 of the subsequent rigid ring 222 in a shingle-like manner.

Each flexible ring 226 is connected to the nose portion 510 of one of the rigid rings 222 and the base portion 514 of an adjacent rigid ring 222. In one form, each flexible portion 226 is connected to the interior surface 526 at the base portion 514, though other configurations can be used, such as being connected to the end of the base portion 514. In one form, each flexible ring 226 is connected to the exterior surface 522 at the nose portion 510, though other configurations can be used, such as being connected to the end of the nose portion 510. In one form, each flexible ring 226 is fully overlapped in the axial direction by the base portion 514 to which it is connected such that the flexible ring 226 is protected. In this way, the rigid rings 222 can be shells that protect the flexible rings 226.

In the example provided, each flexible ring 226 extends between the nose portion 510 and the base portion 514 in a generally corrugated shape, such as a serpentine or a shape that has a generally "S" shaped cross-section, such that the flexible ring 226 permits movement of the adjacent rigid rings 222 while supporting them spaced apart from each other.

The flexible rings 226 can be affixed to the rigid rings 222 in any suitable manner, such as overmolding, adhesives, polymer welding, interlocking geometry for example. The flexible rings 226 may connected to the rigid rings 222 in a manner that seals in grease while sealing out water, dirt, and debris. Each flexible ring 226 is attached to a radially inner side 515 of the base portion 514 to which it is attached. Each flexible ring 226 has an inner portion 517 and an outer portion 519 radially outward of the inner portion 517. The flexible ring 226 follows a serpentine path from the inner portion 517 to the outer portion 519. Each flexible ring 226 is radially between two adjacent rigid rings 222. Each flexible ring 226 has a shape that follows the serpentine path in a radially outward direction relative to the central axis 210.

Accordingly, the boot of the present disclosure provides rigid protection of a shaft joint while permitting flexible movement of the joint.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A boot for a shaft joint comprising:
   a plurality of rigid rings, each rigid ring being disposed about a central axis of the boot, the rigid rings being arranged sequentially along the central axis; and
   a plurality of flexible rings, wherein each rigid ring is connected to an adjacent rigid ring by a corresponding one of the flexible rings, wherein each flexible ring is radially between two adjacent rigid rings,
   wherein each flexible ring has a shape that follows a serpentine path in a radially outward direction relative to the central axis.

2. The boot according to claim 1, wherein the rigid rings increase in outermost diameter with increased position along the central axis from a first end of the boot to a second end of the boot.

3. The boot according to claim 2, wherein each rigid ring axially overlaps at least one other rigid ring.

4. The boot according to claim 1, wherein each rigid ring includes nose portion and a base portion, the nose portion being closer to a first end of the boot than the base portion, the base portion being closer to a second end of the boot than the nose portion, wherein the base portion has a greater outermost diameter than the nose portion.

5. The boot according to claim 4, wherein the base portion of each rigid ring axially overlaps the nose portion of the adjacent rigid ring.

6. The boot according to claim 5, wherein the base portion of each rigid ring is connected to the nose portion of the adjacent rigid ring by the corresponding flexible ring.

7. The boot according to claim 6, wherein each flexible ring is attached to a radially inner side of the base portion to which it is attached.

8. The boot according to claim 7, wherein each flexible ring is attached to a radially outer side of the nose portion to which it is attached.

9. The boot according to claim 8, wherein each flexible ring has an inner portion and an outer portion radially outward of the inner portion, wherein the flexible ring follows the serpentine path from the inner portion to the outer portion.

10. The boot according to claim 8, wherein an entirety of each flexible ring is axially overlapped by the base portion to which it is attached.

11. The boot according to claim 4, wherein the base portion of each rigid ring is connected to the nose portion of the adjacent rigid ring by the corresponding flexible ring.

12. The boot according to claim 4, wherein an outer surface of each rigid ring follows a contour that is concave proximate the nose portion and convex proximate the base portion.

13. The boot according to claim 1, wherein each rigid ring includes nose portion and a base portion, and wherein an outer surface of the rigid ring tapering radially inward from the base portion to the nose portion.

14. The boot according to claim 1 further comprising a flexible first end mount and a flexible second end mount, the first end mount being attached to a first one of the rigid rings that is furthest in a first axial direction, the second end mount being attached to a last one of the rigid rings that is furthest in a second axial direction, the first end mount being configured to surround and seal on a first vehicle component, the second end mount being configured to surround and seal on a second vehicle component such that the plurality of rigid rings and the plurality of flexible rings surround a joint connecting the first vehicle component to the second vehicle component.

15. The boot according to claim 14, further comprising the first vehicle component, the second vehicle component, and the joint, wherein the first vehicle component is a first shaft, the second vehicle component is a second shaft, and the joint is a constant velocity joint.

16. A boot for a shaft joint comprising:
a series of rigid rings disposed about a central axis and arranged sequentially in an axial direction of the central axis, wherein each rigid ring includes nose portion and a base portion, the nose portion being closer to a first end of the boot than the base portion, the base portion being closer to a second end of the boot than the nose portion, wherein the base portion has a greater outermost diameter than the nose portion, wherein the base portion of each rigid ring axially overlaps the nose portion of the adjacent rigid ring, wherein the outermost diameter of the base portions increase with increased position along the central axis from the first end to the second end; and
a plurality of flexible rings, each rigid ring being connected to an adjacent rigid ring by a corresponding one of the flexible rings, wherein the base portion of each rigid ring is connected to the nose portion of the adjacent rigid ring by the corresponding flexible ring, wherein an outer surface of each rigid ring follows a contour that is concave proximate the nose portion and convex proximate the base portion.

17. The boot according to claim 16, wherein each flexible ring has an inner portion and an outer portion radially outward of the inner portion, wherein the flexible ring follows a serpentine path from the inner portion to the outer portion.

18. The boot according to claim 16 further comprising a first end mount and a second end mount, the first end mount being attached to a first one of the rigid rings that is proximate the first end, the second end mount being attached to a last one of the rigid rings that is proximate the second end, the first end mount being configured to seal on a first vehicle component, the second end mount being configured to seal on a second vehicle component such that the plurality of rigid rings and the plurality of flexible rings surround a constant velocity joint connecting the first vehicle component to the second vehicle component.

* * * * *